United States Patent [19]

Gitlin et al.

[11] 4,245,345
[45] Jan. 13, 1981

[54] TIMING ACQUISITION IN VOICEBAND DATA SETS

[75] Inventors: Richard D. Gitlin, Monmouth Beach; Edmond Y. Ho, Colts Neck Township, Monmouth County; Howard C. Meadors, Jr., Ocean; Stephen B. Weinstein, Holmdel, all of N.J.

[73] Assignee: Bell Telephone Laboratories, Incorporated, Murray Hill, N.J.

[21] Appl. No.: 75,646

[22] Filed: Sep. 14, 1979

[51] Int. Cl.$^3$ .................. H04B 3/04; H03H 15/00
[52] U.S. Cl. ...................... 375/13; 375/113; 375/15; 370/100; 333/18
[58] Field of Search .............. 375/13, 15, 20, 97, 375/106, 111, 112, 113; 364/485, 724; 333/18; 370/100; 371/61

[56] References Cited

U.S. PATENT DOCUMENTS

| | | | |
|---|---|---|---|
| 3,524,136 | 8/1970 | Albersheim | 375/112 |
| 3,715,665 | 2/1973 | Chang | 375/13 |
| 3,715,666 | 2/1973 | Mueller et al. | 375/13 |
| 3,810,021 | 5/1974 | Kalet et al. | 375/61 |
| 3,935,535 | 1/1976 | Motley et al. | 375/13 |
| 3,962,637 | 6/1976 | Motley et al. | 375/14 |
| 4,061,978 | 12/1977 | Motley et al. | 375/14 |
| 4,152,649 | 5/1979 | Choquet | 375/13 |

*Primary Examiner*—Benedict V. Safourek
*Attorney, Agent, or Firm*—Ronald D. Slusky

[57] ABSTRACT

In a multipoint data communication system using quadrature-amplitude modulation, a master modem (20) and a plurality of tributary modems (11a, 11b ... 11n) are interconnected via respective transmission channels (13a, 13b ... 13n, 16). Adaptive equalizer circuitry (55, 56) in the master modem equalizes the channel from a particular tributary by multiplying samples of signals received from the tributary by an ensemble of tap coefficients associated with the tributary. The tap coefficient ensembles for each tributary are stored in a memory (91) from which they are retrieved at the start of transmission from that tributary. Timing-acquisition circuitry (29) within the master modem adjusts the phase of the latter's sampling circuitry (23, 27) at the start of transmission from a given tributary so that the received signals are sampled at the correct time points. In particular, a timing acquisition signal having spectral components only within the non-rolloff region of the equalized baseband-equivalent transfer function is transmitted by the tributary. The master samples and equalizes the received timing acquisition signal to form a succession of timing acquisition equalizer outputs. The time by which the operation of the sampling circuitry is to be advanced or retarded is determined as a trigonometric function of two successive ones of the timing acquisition equalizer outputs. The timing acquisition signal is illustratively a double-dotting pattern having a four-symbol-interval period. That period is integrally related to the carrier frequency. This allows the samples needed in order to begin forming the timing acquisition equalizer outputs to be generated by replicating the samples taken over only four symbol intervals.

48 Claims, 8 Drawing Figures

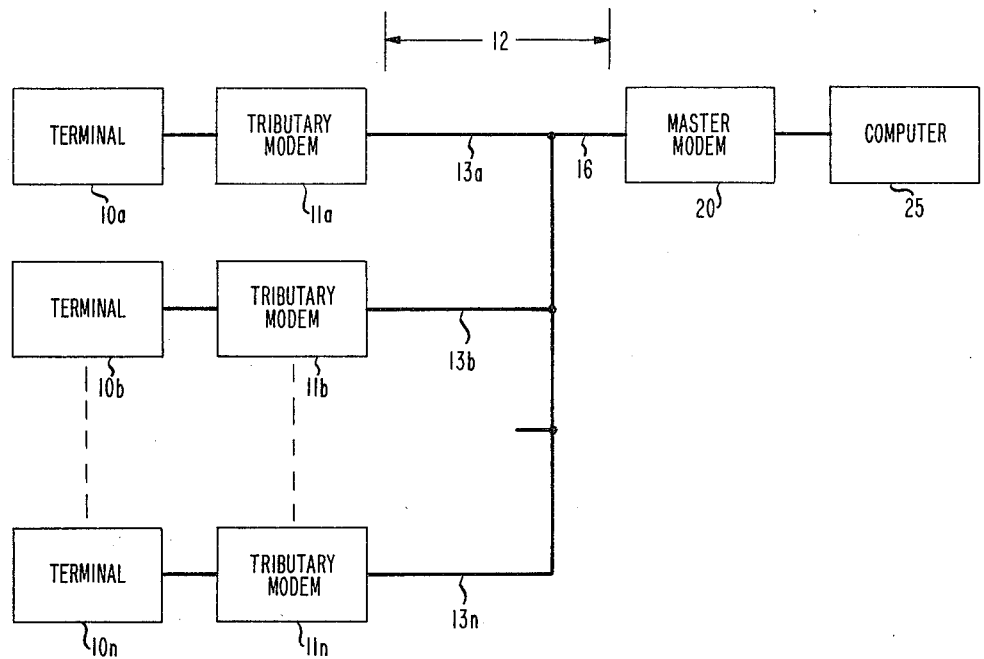
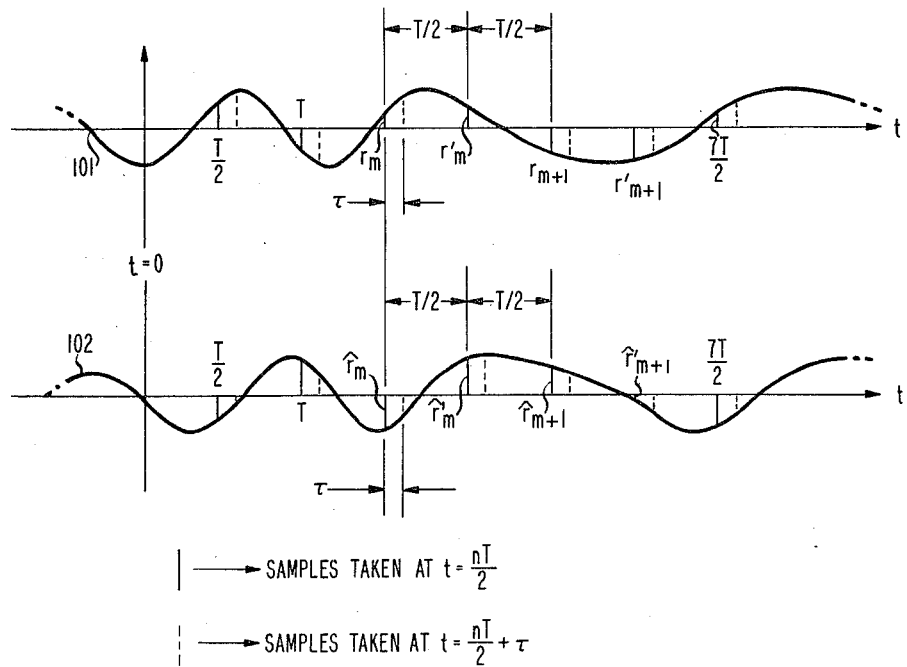

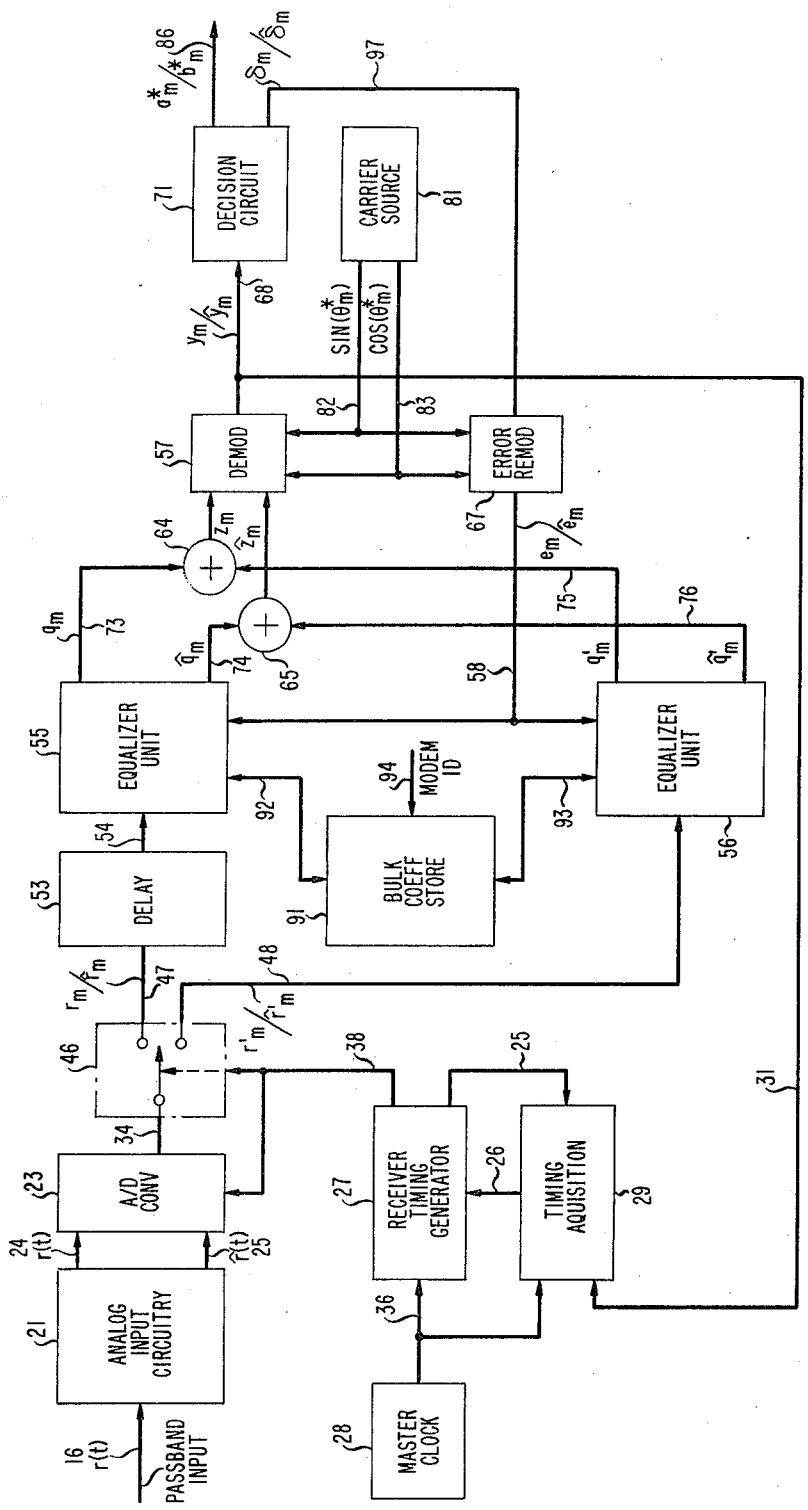

TIMING ACQUISITION IN VOICEBAND DATA SETS

BACKGROUND OF THE INVENTION

The present invention relates to automatic equalizers which compensate for the distorting effects of bandlimited channels on transmitted data signals.

Automatic equalizers are necessary for accurate reception of high speed data signals transmitted over bandlimited channels with unknown transmission characteristics. The equalizer, which is resident in the receiver portion of a data set, or "modem", is generally in the form of a transversal filter. Samples of the incoming data signal, referred to herein as "line samples", are formed at a predetermined sampling rate. These are applied to the filter, where they are multiplied by respective tap coefficients. The resulting products are added together and, if necessary, demodulated to generate what is hereinafter referred to as a "baseband equalizer output," or just "equalizer output." The equalizer output is thereafter quantized to recover the transmitted data. In addition, an error signal is formed equal to the difference between the equalizer output and a reference signal which represents the transmitted data symbol. In the so-called adaptive type of automatic equalizer, in particular, the reference signal is derived from the decision made in the receiver (on the basis of the equalized signal value) as to what data symbol was transmitted. The error signal is used to update the tap coefficient values in such a way as to minimize a measure of the distortion—assumed to be primarily intersymbol interference—introduced by the channel.

An important equalizer operating parameter, in addition to the rate at which the line samples are formed, is their time occurrence with respect to the received signal. This parameter, referred to as the timing epoch, is the principal focus of the present invention. In particular, equalizing a given channel when the line samples are taken at different sets of time points, i.e., with different timing epochs, results in different ensembles of tap coefficient values. Before accurate data recovery can be assured, then, it is necessary to arrive at an appropriate combination of timing epoch and coefficient values.

In steady-state operation, adaptive equalizers are typically capable of operating satisfactorily over at least a range of timing epochs. There is, however, a nominally optimum timing epoch, corresponding to a particular set of sampling points on the received signal. The optimum timing epoch, in particular, is that epoch which allows the channel to be "learned" most quickly. In typical equalizer start-up operation, hereinafter referred to as a "long" start-up, a timing acquisition tone from which this optimum timing epoch (for a close approximation thereto) can be ascertained, is sent ahead of the actual intelligence to be transmitted, the latter being hereinafter referred to as the "message" data. The timing acquisition tone is typically followed by a predetermined equalizer "training sequence," in response to which the coefficients converge, i.e., take on an ensemble of values which, for the selected timing epoch, corrects for intersymbol interference in the channel.

The long start-up approach is suitable for use in applications in which the transmitted messages are long compared to the start-up period. However, in some applications, such as many multipoint network applications, this condition is often not met. A multipoint network, more particularly, is comprised of a master, or control, modem connected to a plurality of slave, or tributary, modems via respective dedicated transmission channels. Each tributary modem receives data only from the master modem and thus over one particular channel. Accordingly, the tributary is able to continually use the same tap coefficient values to recover successive messages transmitted to it. In fact, each tributary modem is able to continually fine tune its coefficient values and timing epoch. This is because all transmissions emanating from the master modem are received (although not necessarily responded to) by each tributary modem over its channel from the master modem.

However, before the master modem can recover data from a particular tributary, its tap coefficients and timing epoch must be set to appropriate values for the channel associated with that tributary. Conventional start-up techniques if used in multipoint network applications, would waste a great deal of valuable transmission time because the master modem typically receives communications from a particular tributary for only a short time before turning its attention to another. Indeed, conventional start-up techniques impose an upper limit on the throughput of such a system, i.e., the amount of message data which can be transmitted per unit time. This is because, in general, the higher the data rate the system is operated at, the longer the required start-up period. In order to ameliorate this problem, it has been proposed to store in the master modem the already-learned, or "converged", tap coefficients associated with each channel. When data are to be received over a given channel, the associated coefficient values are read out of memory and "jam set" into the equalizer, obviating the need for the modem to "relearn" the channel for each transmission.

Determining the appropriate timing epoch for the jam set coefficients presents a problem, however. In theory, a timing epoch could be established at the start of an initial message from a tributary using, for example, the technique disclosed in U.S. Pat. No. 3,962,637 issued June 8, 1976 to Motley et al. Once a set of tap coefficients is arrived at using this timing epoch, all one would need to do in order to use the same coefficients for subsequent transmissions from the same tributary would be to re-acquire the same timing epoch.

The problem with such an approach is that there is a tendency for the relative phase between the transmitter and receiver clocks to drift over time. This necessitates the use of some form of continually operating timing recovery circuitry, the function of which is to advance or retard the receiver timing circuitry so as to ensure that the received signal is, in fact, sampled with the correct timing epoch. If an ideal timing recovery technique were available, an approach such as disclosed in the Motley et al patent could, at least in theory, be workable in a system which uses coefficient jam-setting. As a practical matter, however, the timing recovery techniques of which we are aware are themselves subject to a certain amount of jitter-at least when operating on random data. That is, they are capable of maintaining the timing epoch only within some range about the nominally correct value. This is not a problem so far as accurate data recovery is concerned; as long as the rate of timing drift is within design limits, the tap coefficient updating algorithm will change the coefficient values to compensate for same. By the same token, when a previously-determined ensemble of coefficient values is jam set into the equalizer at the start of transmission, those coefficients will, in general, have different values than they had at any particular time at which the timing epoch was known during any previous transmission. They thus require a different, unknown, timing epoch. One way around this problem is to start with a predetermined timing epoch and allow the jam set coefficient values to rotate (in response to a training sequence, for example) to compensate for any timing epoch error prior to the transmission of message data. This, however, may be too time consuming. Alternatively, the sampling phase drift problem might be avoided by using very accurate or slaved clocks, eliminating the need to recover timing information from the received signal. This approach, however, is costly, complex and possibly unworkable.

SUMMARY OF THE INVENTION

The principal object of the present invention, then, is to provide a rapid and inexpensive technique for determining the timing epoch to be used with a previously-determined set of automatic equalizer tap coefficient values.

The above and other objects are achieved in accordance with the present timing acquisition technique by transmitting a periodic timing acquisition signal over the channel in question. The timing acquisition signal, after transmitter filtering, has spectral (frequency) components only within that portion of the equalized baseband-equivalent transfer function known as the non-rolloff region. The received timing acquisition signal is sampled with an arbitrary timing epoch, is equalized using a previously-determined ensemble of tap coefficient values for the channel and, unless at baseband, is demodulated. The resulting equalizer outputs, hereinafter referred to as timing acquisition equalizer outputs, represent successive samples of a periodic waveform. At the heart of the present invention is our recognition that if and only if the timing acquisition signal in fact has the above-stated spectral composition, the difference between (a) the locations of the above-mentioned samples along the periodic waveform and (b) what their locations therealong would be if the timing epoch were correct (which locations are known a priori), is equal to the timing error, i.e., the difference between the arbitrary timing epoch with which the line samples are currently being formed and the correct timing epoch. The timing error is readily determined from the timing acquisition equalizer outputs and is illustratively determined as a trigonometric function of as few as two of them. Once the timing error is determined, the timing epoch can be immediately adjusted to the correct value.

The invention is illustrated herein in the context of a quadrature-amplitude modulation (QAM) system. The timing acquisition signal is illustratively generated by modulating a so-called double-dotting pattern onto both the in-phase and quadrature-phase carriers. The received timing acquisition signal is equalized and demodulated, the demodulation being performed without first determining the correct demodulating carrier phase. The demodulator output is comprised of first and second in-phase and quadrature-phase signal sequences of timing acquisition equalizer outputs. The timing acquisition equalizer outputs of one sequence will have larger values than those of the others (unless the demodulating carrier phase just happens to be correct). In theory, either sequence can be used to carry out the above-described timing acquisition. In the present illustrative embodiment, however, the sequence having the larger timing acquisition equalizer outputs is used; this ensures an accurate determination of the timing error. The correct demodulating carrier phase is thereafter determined while line samples with the new (correct) timing epoch are being formed. This approach is advantageous in that no separate time period need be set aside prior to the transmission of message data for carrier phase recovery. The overall time required before message data can be transmitted is thus minimized.

BRIEF DESCRIPTION OF THE DRAWING

FIG. 1 depicts a communication system comprised of a master modem and plurality of tributary modems;

FIG. 2 is a block diagram of the receiver portion of the master modem of FIG. 1, the receiver including timing acquisition circuitry which carries out the timing acquisition technique of the present invention;

FIG. 3 shows signal waveforms helpful in explaining the operation of the receiver of FIG. 2;

DETAILED DESCRIPTION

Figure 4:
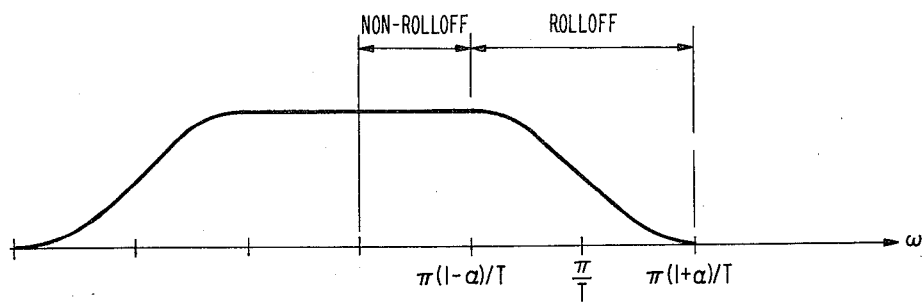
FIG. 4 shows a typical equalized baseband-equivalent transfer function.

A communication system in which the present invention is particularly useful is shown in FIG. 1. In this system, a computer 25 communicates on a time-shared basis with a plurality of data terminals 10a, 10b ... 10n via a multipoint network 12. In particular, computer 25 is connected to a particular one of terminals 10a, 10b ... 10n via a channel which includes common path 16 and a respective one of the branch paths 13a, 13b ... 13n. Paths 13a, 13b ... 13n and 16 are illustratively private-line voiceband telephone circuits. Terminals 10a, 10b ... 10n are connected to network 12 via tributary modems 11a, 11b ... 11n. Computer 25 is connected to network 12 via master modem 20. Modems 11a, 11b ... 11n and 20 provide several functions. One is to correct for distortion-notably intersymbol interference-and other channel irregularities. The other is to modulate the data which is to be transmitted into, and demodulate it out of, the passband of the channel.

With respect to the latter function, more particularly, the system of FIG. 1 illustratively uses a quadrature-amplitude modulation (QAM) scheme. (The invention is, however, applicable to transmission systems using other modulation schemes as well as to baseband systems.) In the present QAM arrangement, four paralleled information bits are communicated during each symbol interval of duration T=1/2400 sec. The symbol rate is thus 2400 baud, yielding a binary data transmission rate of 9600 bits per second. During each symbol interval, the four bits to be transmitted are encoded into two signal levels, each of which can take on one of the four values [+1, −1, +3, −3]. The two signal levels transmitted during the $m^{th}$ symbol interval comprise data symbol $A_m$—a complex quantity having real and imaginary components $a_m$ and $\hat{a}_m$, respectively. Components $a_m$ and $\hat{a}_m$, in turn, amplitude modulate respective 1800

Hz. in-phase and quadrature-phase carrier waves. The two modulated signals, when added together, form a QAM signal which is then transmitted.

Attention is now directed to FIG. 2, which shows a block diagram of the receiver portion of modem 20. The QAM passband signal transmitted by a particular tributary modem is received by modem 20 on lead 16. The received signal r(t) passes to analog input circuitry 21 comprised of a bandpass filter and Hilbert transform circuit. The output of circuit 21 is comprised of a Hilbert transform pair r(t) and r̂(t) derived from the received passband signal. These are passed to an A/D converter 23.

A master clock 28 generates 128 master clock pulses every T seconds on lead 36. These are received by receiver timing generator 27. The latter counts the pulses on lead 36 and generates timing signals on a number of output leads to control the sequencing of the various signal processing functions within the master modem. One of these leads shown explicity in FIG. 2 is lead 38. The latter extends pulses to A/D converter 23 once every T/2 seconds. Converter 23 is thus operated at 2/T=4800 times per second, i.e., twice the symbol rate, to generate two passband, i.e., modulated, line samples $R_m$ and $R_m'$ during the $m^{th}$ receiver symbol interval. (An alternative way of generating $R_m$ and $R_m'$ is to first sample and digitize the received signal at a rate greater than twice its highest frequency component and then pass the resulting signal through a digital phase-splitter.)

QAM signals are conveniently expressed and processed as complex numbers, each having a real and imaginary component. The real and imaginary components of the line samples formed by A/D converter 23 are provided one after the other in serial form as separate ten-bit digital signals, or words, on output lead 34. (Each of the other signal leads in FIG. 2 similarly carries its signals in serial form.) Notationally, the real and imaginary components of sample $R_m$ are represented as $r_m$ and $r̂_m$. Those of sample $R_m'$ are represented as $r_m'$ and $r̂_m'$.

Line samples $R_m$ and $R_m'$, which are spaced T/2 seconds apart, are equalized using two synchronous equalizer units 55 and 56. Each of these units is adapted to filter a complex sample stream in which the samples are spaced T seconds apart. Switch 46, also responsive to the pulses on lead 38, applies components $r_m$ and $r̂_m$ to equalizer unit 55 and components $r_m'$ and $r̂_m'$ to equalizer unit 56. Separate data streams, each containing samples spaced T seconds apart, are thus presented to each equalizer unit. A delay unit 53 is interposed between switch 46 and equalizer unit 55 so that $r_m$ and $r̂_m$ are applied to equalizer unit 55 at the same time that $r_m'$ and $r̂_m'$ are applied to equalizer unit 56. This advantageously allows equalizer units 55 and 56 to be controlled via the same clocking and timing leads (not shown) from timing generator 27.

The output signals of equalizer units 55 and 56 during the $m^{th}$ receiver symbol interval are complex signals $Q_m$ and $Q_m'$ given by $$Q_m = \sum_{i=1}^{2M} C_i(m) R_{m-i}$$

and $$Q_m' = \sum_{i=1}^{2M} C_i'(m) R_{m-i}'$$

In these experiences the $C_i(m)$'s and $C_i'(m)$'s, i=(1,..., 2M), represent respective ensembles of complex "tap" coefficients, stored in equalizer units 55 and 56, respectively. M is an integer illustratively equal to 16. Each coefficient has a particular value associated with the $m^{th}$ receiver interval. The real and imaginary components of $Q_m$ are $q_m$ and $q̂_m$; those of $Q_m'$ are $q_m'$ and $q̂_m'$. The real and imaginary components of each $C_i(m)$ are $c_i(m)$ and $ĉ_i(m)$; those of each $C_i'(m)$ are $c_i'(m)$ and $ĉ_i'(m)$. The above expressions for $Q_m$ and $Q_m'$ are thus expressed in terms of their real and imaginary components as $$q_m = \sum_{i=1}^{2M} c_i(m) r_{m-i} - \sum_{i=1}^{2M} ĉ_i(m) r̂_{m-i}$$

$$q̂_m = \sum_{i=1}^{2M} c_i(m) r̂_{m-i} + \sum_{i=1}^{2M} ĉ_i(m) r_{m-i},$$

$$q_m' = \sum_{i=1}^{2M} c_i'(m) r_{m-i}' - \sum_{i=1}^{2M} ĉ_i'(m) r̂_{m-i}', \text{ and}$$

$$q̂_m' = \sum_{i=1}^{2M} c_i'(m) r̂_{m-i}' + \sum_{i=1}^{2M} ĉ_i'(m) r_{m-i}'.$$

Components $q_m$, $q̂_m$, $q_m'$ and $q̂_m'$ appear as individual ten-bit words on leads 73, 74, 75 and 76, respectively. Components $q̂_m$ and $q̂_m'$ are added together in an adder 64 while components $q_m$ and $q_m'$ are added together in an adder 65. The outputs of adders 64 and 65 are the real and imaginary components $z_m$ and $ẑ_m$ of a passband equalizer output $Z_m$ representing the modulated version of transmitted symbol $A_m$. (Passband equalizer output $Z_m$ could have been equivalently generated using a single equalizer unit having taps spaced at T/2 second intervals.)

Passband equalizer output $Z_m$ is demodulated to baseband by demodulator 57. The demodulated output of demodulator 57 is baseband equalizer output $Y_m$, representing the baseband version of symbol $A_m$. Baseband equalizer output $Y_m$ is hereinafter more concisely referred to as equalizer output $Y_m$. The latter has real and imaginary components $y_m$ and $ŷ_m$, provided seriatim as ten-bit words on lead 68. The demodulation process performed by demodulator 57 is expressed in complex notation as $$Y_m = Z_m e^{-j\theta_m^*}$$

where $\theta_m^*$ is an estimate of the current carrier phase. In terms of real and imaginary components, the demodulation process is expressed as $$y_m = z_m \cos(\theta_m^*) + ẑ_m \sin(\theta_m^*)$$

$$ŷ_m = ẑ_m \cos(\theta_m^*) - z_m \sin(\theta_m^*).$$

For purposes of generating $y_m$ and $ŷ_m$ in accordance with the above expressions, demodulator 57 receives nine-bit digital representations of $\sin(\theta_m^*)$ and $\cos(\theta_m^*)$ on output leads 82 and 83 of carrier source 81.

Components $y_m$ and $ŷ_m$ are quantized in decision circuit 71. The resulting outputs, provided one after the other on lead 86, are decisions $a_m^*$ and $â_m^*$ as to the signal levels represented by components $a_m$ and $â_m$ of symbol $A_m$. Decisions $a_m^*$ and $â_m^*$ can be thought of as the real and imaginary components of a complex decision $A_m^*$.

Decision circuit 71 also provides, on lead 97, the real and imaginary components, $\delta_m$ and $\hat{\delta}_m$, of a complex baseband error signal $\Delta_m$ associated with the data symbol in question. Error signal $\Delta_m$ is equal to the quantity $(Y_m - A_m^*)$. In particular, $\delta_m = (y_m - a_m^*)$ and $\hat{\delta}_m = (\hat{y}_m - \hat{a}_m^*)$, with $\delta_m$ and $\hat{\delta}_m$ being expressed as respective twelve-bit words. Error signal $\Delta_m$ is remodulated in error remodulator 67 to yield a remodulated, or passband, error signal $E_m$ given by $$E_m = \Delta_m e^{+j\theta_m^*}.$$

The real and imaginary components of $E_m$, $e_m$ and $\hat{e}_m$, are generated by remodulator 67 in accordance with $$e_m = \delta_m \cos(\theta_m^*) - \hat{\delta}_m \sin(\theta_m^*)$$

$$\hat{e}_m = \delta_m \sin(\theta_m^*) + \hat{\delta}_m \cos(\theta_m^*).$$

In order to form these quantities, remodulator 67, like demodulator 57, receives $\sin(\theta_m^*)$ and $\cos(\theta_m^*)$ from carrier source 81.

Components $e_m$ and $\hat{e}_m$ are extended seriatim to equalizer units 55 and 56 on lead 58 for purposes of coefficient updating, as described below. (An alternate way of generating error signal $E_m$ would be to remodulate complex decision $A_m^*$ and subtract it from passband equalizer output $Z_m$. In either case, the value of $E_m$ is the same, it being equal to the difference, modulated at the carrier frequency, between the pre- and post-quantized values of equalizer output $Y_m$).

At this point, the values of the $C_i(m)$ and $C_i'(m)$ tap coefficient values are updated within equalizer units 55 and 56, respectively, in preparation for the next, $(m+1)^{st}$, symbol interval. The updating rules illustratively used are $$C_i(m+1) = C_i(m) - \alpha E_m R_{m-i} - \alpha\mu \text{SGN}[C_i(m)] \text{ and}$$

$$C_i'(m+1) = C_i'(m) - \alpha E_m R_{m-i}' - \alpha\mu \text{SGN}[C_i'(m)],$$

where $\alpha$ and $\mu$ are selected constants and the value of the complex function SGN[ ] is $\pm 1 \pm j$ depending on the signs of the real and imaginary components of its complex argument. These updating rules implement the so-called mean-squared updating algorithm, modified in accordance with the tap leakage technique taught in commonly-assigned, copending U.S. patent application, Ser. No. 16,495 filed Mar. 1, 1979.

The above updating rules are expressed in terms of their real and imaginary components as $$c_i(m+1) = c_i(m) - \alpha e_m r_{m-i} + \alpha \hat{e}_m \hat{r}_{m-i} - \alpha\mu \text{sgn}[c_i(m)],$$

$$\hat{c}_i(m+1) = \hat{c}_i(m) - \alpha e_m \hat{r}_{m-i} - \alpha \hat{e}_m r_{m-i} - \alpha\mu \text{sgn}[\hat{c}_i(m)],$$

$$c_i'(m+1) = c_i'(m) - \alpha e_m r_{m-i}' + \alpha \hat{e}_m \hat{r}_{m-i}' - \alpha\mu \text{sgn}[\hat{c}_i'(m)] \text{ and}$$

$$\hat{c}_i'(m+1) = \hat{c}_i'(m) - \alpha e_m \hat{r}_{m-i}' - \alpha \hat{e}_m r_{m-i}' - \alpha\mu \text{sgn}[c_i'(m)],$$

where the value of the real function sgn[ ] is $+1$ or $-1$, depending on the sign of its argument.

Although the above description has focused on the operation of master modem 20 in recovering data transmitted from a tributary modem, it will be appreciated that similar signal processing is needed in each tributary in order to accurately recover data transmitted to it from the master. Once an appropriate set of coefficients for use in a particular tributary is determined, those same coefficients are used for subsequent transmissions received by that tributary since it receives all its transmissions over but a single channel; a tributary modem communicates only with the master modem, not with other tributaries. Indeed, each tributary modem is able to continually fine-tune its coefficient values. This is because all transmissions emanating from the master modem are received (although not responded to) by each tributary modem over its channel from the master modem.

Master modem 20 by contrast, receives communications over many different channels. Before it can recover data from a particular tributary, its tap coefficients must be set to values which compensate for the characteristics of the channel involved. An appropriate set of coefficient values could be determined from "scratch" at the start of each transmission. This is a time-consuming process, however, and, as described above, limits the amount of useful data that can be transmitted per unit time from a tributary modem to the master modem.

In order to ameliorate this problem, as shown in FIG. 2, modem 20 is provided with a bulk coefficient store 91. Once communications with a particular tributary modem are completed, the then-existing coefficient values in equalizer units 55 and 56 are read into store 91 via leads 92 and 93, respectively. The next time a message is to be received from that same tributary modem, the address of that modem is provided to store 91 via lead 94. This causes the previously-determined coefficients to be read out of store 91 and "jam set" into equalizer units 55 and 56 via, again, leads 92 and 93.

There is another factor to be taken into account, however, that being the so-called timing epoch. This may be understood by reference to FIG. 3. Waveforms 101 and 102 in that FIG. are typical analog outputs of circuit 21 on leads 24 and 25, respectively. As previously discussed, the real (imaginary) line sample components $r_m$ and $r_m'$ ($\hat{r}_m$ and $\hat{r}_m'$) are formed alternately by sampling waveform 101 (102) every $T/2$ seconds. The point to be appreciated is that the particular tap coefficient values that result from the above-described coefficient updating process are a function of not only the channel, but where along waveforms 101 and 102 the samples are formed.

For example, the line sample components $r_m, r_m'$, etc. and $\hat{r}_m, \hat{r}_m'$, etc. are shown by the solid sample lines in FIG. 3 as being formed with one timing epoch defined by $t = nT/2$, $n = 0, 1, 2 \ldots$. Sampling at these time points results in one ensemble of coefficient values. If, however, waveforms 101 and 102 were to be sampled $\tau$ seconds later at $t = (nT/2) + \tau$, as indicated by the dashed sample lines, the coefficient updating process would arrive at a different ensemble of coefficient values. Thus, reading a previously-determined ensemble of coefficient values out of store 91 for use in recovering currently transmitted data is useful only if the received signal is sampled with the timing epoch associated with those coefficient values. Stated another way, the filter characteristic specified by a particular ensemble of jam-set coefficient values cause equalizer output $Y_m$ to be optimally free of intersymbol interference only when waveforms 101 and 102 are sampled at a particular, optimum, set of sampling points.

The task of providing the proper timing epoch for a previously-determined set of coefficients could, in theory, be performed by transmitting a short burst of an appropriate timing acquisition tone from the tributary to the master and adjusting the receiver timing generator such that samples are formed at some predetermined point on the received tone. In theory, again, once an ensemble of tap coefficients is arrived at using this timing epoch, all one would need to do in order to use the same coefficients for subsequent transmissions from the same tributary would be to re-transmit the timing acquisition tone and reacquire the same timing epoch.

The problem with such an approach is that there is a tendency for the relative phase between the transmitter and receiver clocks to drift due to such factors as deviation between the transmitter and receiver clock frequencies and variations over time in the delay characteristics of the channel. Such drift, if uncorrected, would cause the received waveform to be sampled at the wrong time points for the tap coefficients then being used. This phenomenon necessitates the use of some form of continually operating timing recovery circuitry, the function of which is to advance or retard the receiver timing circuitry so as to ensure that the received signal is, in fact, sampled with the correct timing epoch. If an ideal timing acquisition technique were available, the above-described approach could, at least in theory, be workable in a system which uses coefficient jam-setting. As a practical matter, however, the timing recovery techniques of which we are aware are themselves subject to a certain amount of jitter, at least when operating on random data. That is, they are capable of maintaining the timing epoch only within some range about the nominally correct value. This is not a problem so far as accurate data recovery is concerned; as long as the rate of timing drift is within design limits, the tap coefficient updating algorithm will change the coefficient values to compensate for same. By the same token, when a previously-determined ensemble of coefficient values is jam set into the equalizer at the start of a transmission, those coefficients will, in general, have different values than they had at any particular time at which the timing epoch was known during any previous transmission. They thus require a different, unknown, timing epoch. The present invention is directed to a technique for determining that timing epoch.

The theoretical basis of the invention will now be explained in the context of a QAM system.

Assume that a periodic data pattern with period NT sec is generated in the transmitting modem for modulation onto both the in-phase and quadrature-phase carriers. The frequency spectrum of the resulting periodic complex signal is comprised of components at radian frequencies $\pm k\Omega$, $k=0, 1, 2 \ldots N-1$ having complex amplitudes $C(k\Omega)$, where $\Omega = 2\pi/NT$. At the receiver, the received signal is sampled every $T/p$ seconds, where p is a selected integer $\geq 1$, and the signal is equalized using a previously-determined set of tap coefficients. Let time be defined such that the received signal is sampled with the correct timing epoch at time points defined by $t=nT/p$, $n=0, 1, 2 \ldots$. Assume that, in fact, there is a timing error, $\tau$, so that the received signal is sampled at time points $t=(nT/p)+\tau$. The $m^{th}$ baseband equalizer output is then given by $$Y_m = \sum_{k=-(N-1)}^{(N-1)} C(k\Omega) \sum_{n=-\infty}^{\infty} G(k\Omega - 2\pi n/T) e^{j(k\Omega - 2\pi n/T)(mT+\tau)}$$

In the above expression, the complex function $G(\omega)$ is the equalized baseband-equivalent transfer function between the source of the periodic signal in the transmitting modem and the demodulator output in the receiving modem. A typical such transfer function is shown in FIG. 4. The region $\pi(1-\alpha)/T < \omega < \pi(1+\alpha)/T$ is characterized by frequency-dependent gain and is referred to as the rolloff region. The parameter $\alpha$, $0 < \alpha < 1$, is the percent rolloff. The region $0 < \omega < \pi(1-\alpha)/T$ is characterized by constant gain and is referred to as the non-rolloff region. Moreover, $G(\omega) = 0$ for $|\omega| \geq \pi(1+\alpha)/T$. With $G(\omega)$ so defined, and with some mathematical manipulation, the above expression for $Y_m$ becomes $$Y_m = \sum_{k=0}^{(N-1)} C(k\Omega) e^{jk\Omega(mT+\tau)} [G(k\Omega) + G(k\Omega - 2\pi/T) e^{-j2\pi\tau/T}]$$
$$+ C(-k\Omega) e^{-jk\Omega(mT+\tau)} [G(-k\Omega) + G(-k\Omega + 2\pi/T) e^{j2\pi\tau/T}].$$

The frequency components $C(k\Omega)$ can be expressed in terms of magnitude $|C(k\Omega)|$ and phase $\theta(k\Omega)$ as $C(k\Omega) = |C(k\Omega)| e^{j\theta(k\Omega)}$. Moreover, since the same data pattern was modulated onto both the in-phase and quadrature phase carriers, $C(-k\Omega) = |C(k\Omega)| e^{-j\theta(k\Omega)}$. Furthermore, we define $$[G(k\Omega) + G(k\Omega - 2\pi/T) e^{-j2\pi\tau/T}] \equiv G_1(k\Omega) =$$
$$|G_1(k\Omega)| e^{j\phi_1(k\Omega,\tau)}$$
$$[G(-k\Omega) + G(-k\Omega + 2\pi/T) e^{j2\pi\tau/T}] \equiv G_2(k\Omega) =$$
$$|G_2(k\Omega)| e^{j\phi_2(k\Omega,\tau)}.$$

Making these substitutions, we have that $\text{Re}[Y_m] = y_m$, which is the baseband in-phase channel equalizer output, can be written as $$Y_m = \sum_{k=0}^{(N-1)} |C(k\Omega)| [|G_1(k\Omega)| \cos(k\Omega(mT + \tau) + (\theta(k\Omega,\tau) + \phi_1(k\Omega,\tau))/k\Omega)$$
$$+ |G_2(k\Omega)| \cos(k\Omega(mT + \tau) + (-\theta(k\Omega) + \phi_2(k\Omega,\tau))/k\Omega)].$$

Since $\text{Im}[Y_m] = \hat{y}_m$, the baseband quadrature-phase channel equalizer output, is of a similar form with the cosines being replaced by sines, the following discussion is applicable to both $y_m$ and $\hat{y}_m$.

If the frequencies $k\Omega$ fall within the rolloff region of the equilized baseband-equivalent transfer function, $G_1(k\Omega)$ and $G_2(k\Omega)$ are not known. Thus neither their magnitudes nor phases $\phi_1(k\Omega,\tau)$ and $\phi_2(k\Omega,\tau)$ are known. It is thus not possible to determine $\tau$ from $y_m$. On the other hand, for frequencies in the non-rolloff region, it can be shown that $G(\Omega - 2\pi/T) = 0$ and $G(\omega) = G(-\omega)$. Thus, $G_1(k\Omega) = G_2(k\Omega) = G$, where $G$ is a real constant. Thus, for frequencies in the non-rolloff region, $$Y_m = 4G \sum_{k=0}^{N} |C(k\Omega)| \cos k\Omega(mT + \tau)\cos\theta(k\Omega).$$

If the timing error were to be zero, we would of course have $$Y_m = 4G \sum_{k=0}^{N} |C(k\Omega)| \cos k\Omega(mT)\cos\theta(k\Omega).$$

The term $4G|C(k\Omega)|$ is a constant at each frequency $k\Omega$ and thus represents a gain term for each component. Moreover, the phase function $\theta(k\Omega)$ is known since it is a function of the (known) transmitted data pattern. Thus it is seen that for $\tau=0$, and $Y_m$'s represent instantaneous samples of a periodic waveform at a particular determinable set of time points along that waveform (m representing a time index), while for $\tau \neq 0$ they represent instantaneous samples of that same waveform displaced therealong by that same quantity, $\tau$.

In summary, then, it is seen that if the transmitted periodic signal has frequency components only in the non-rolloff region (i.e., the region for which $G(\omega - 2\pi/T) = 0$ and $G(\omega) = G(-\omega)$ for all $\omega$) it is possible to determine the timing error from either the in-phase or quadrature-phase channel baseband equalizer outputs resulting from that signal. (It may also be noted that the periodic signals transmitted in each channel need not be the same although they were assumed so hereinabove for convenience in illustrating the principles involved. Moreover, the fact that the above discussion is in terms of equivalent baseband shows that the results are valid independent of the modulation scheme.)

In accordance with the present invention, then, $\tau$ is determined by transmitting a data pattern which, after transmitter filtering, results in a signal having frequency components only within the non-rolloff region. The received signal is sampled with an arbitrary timing epoch and equalized with a previously-determined set of tap coefficients. The resulting equalizer outputs represent successive instantaneous samples of some periodic signal at a particular set of time points defined by $t = mT + \tau'$, $m = 0, 1, 2 \ldots$. Here, $\tau'$ is the difference between the actual locations of those samples, and what their locations would be if the timing epoch were correct. A consequence of the above discussion is that that difference, $\tau'$, is in fact equal to the timing error, $\tau$. The parameter $\tau'$ can be determined from the equalizer outputs. Thus, $\tau$ can be determined and the receiver timing phase adjusted to eliminate the timing error.

In the present illustrative embodiment, more particularly, the timing acquisition signal is generated by modulating a so-called double dotting pattern, $+1, +1, -1, -1, +1, +1$ etc., onto both the in-phase and quadrature-phase carriers when timing acquisition is to be performed. Since $1/T = 2400$, the period of the double dotting pattern is 1/600 sec. After baseband filtering, this results in a sinusoid at 600 Hz. The percent of rolloff, $\alpha$, is illustratively 0.12. Thus, the non-rolloff region extends from dc to $2112\pi$ rad/sec = 1056 Hz. As required, then, the 600 Hz. sinusoid is within the non-rolloff region.

Figure 5:
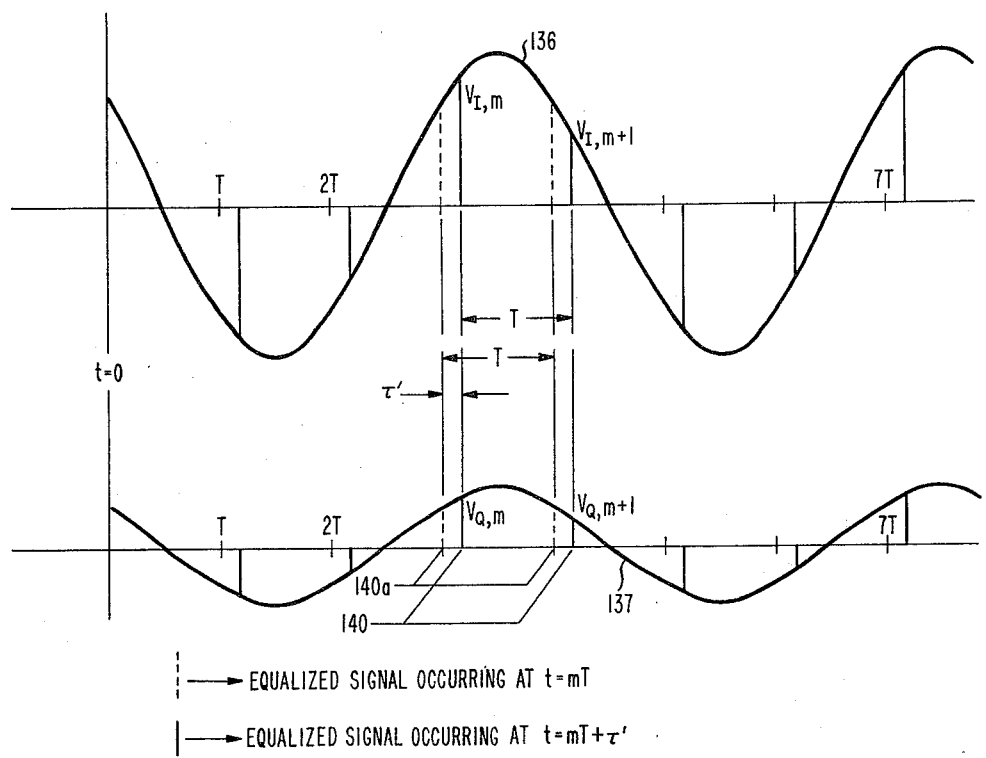
FIG. 5 shows signal waveforms helpful in explaining the principles of the present invention.

At the receiver, equalization and demodulation of the received signal using the previously-determined ensemble of tap coefficients for the channel in question results in the timing acquisition equalizer outputs shown in FIG. 5. The in-phase outputs are denominated $v_{I,m}$, $v_{I,m+1}$, etc. The quadrature-phase outputs are denominated $v_{Q,m}$, $v_{Q,m+1}$, etc. Both the $v_I$'s and $v_Q$'s are periodic samples of 600 Hz. sinusoids 136 and 137. (Sinusoids 136 and 137 are convenient mathematical constructs; no such analog waveforms actually appear within the receiver.)

Each of the $v_I$'s (or $v_Q$'s) represents a successive one of the data symbols $+1, +1, -1, -1$, etc. transmitted on the in-phase (quadrature-phase) carrier. Thus, if the timing epoch were correct, the $v_I$'s ($v_Q$'s) would all have the same amplitude and, as indicated by the dashed sample lines, would constitute samples of sinusoid 136 (137) at time points 140a. Time is defined such that the latter time points occur at $t = mT$, $(m = 0,1,2 \ldots)$. In actuality, the $v_I$'s ($v_Q$'s) are at time points 140 occurring at $t = mT + \tau'$. Once any two successive $v_I$'s ($v_Q$'s) are known, $\tau'$ can be determined trigonometrically therefrom (as outlined below). The determination of $\tau'$ may be inaccurate if the sample magnitudes of the $v_I$'s or $v_Q$'s are near zero. Thus, the choice of whether to determine $\tau'$ from the $v_I$'s or the $v_Q$'s is made on the basis of which is larger; sinusoids 136 and 137 have different amplitudes because in the illustrative embodiment, the $v_I$'s and $v_Q$'s are formed before the carrier phase estimate $\theta_m^*$ has been made in carrier source 81. Whichever set of equalizer outputs is the larger is notationally represented as $v_{L,m}$, $v_{L,m+1}$, etc.

Once any two successive $v_L$'s are known, the magnitude of $\tau'$ is readily determined trigonometrically as
$$\tau' = 2T/\pi[(\pi/4) - \tan^{-1}(\gamma/\beta)],$$

where $\beta =$ the larger of $|v_{L,m}|$ and $|V_{L,m+1}|$ and $Y =$ the smaller of $|v_{L,m}|$ and $|v_{L,m+1}|$.

Moreover, the sign of $\tau'$, $\text{sgn}[\tau']$, is given by $\text{sgn}[\tau'] = \text{sgn}[v_{L,m}]\text{sgn}[v_{L,m}]\text{sgn}[v_{L,m+1}]\text{sgn}[|v_{L,m+1}| - |v_{L,m}|]$.

Figure 6:
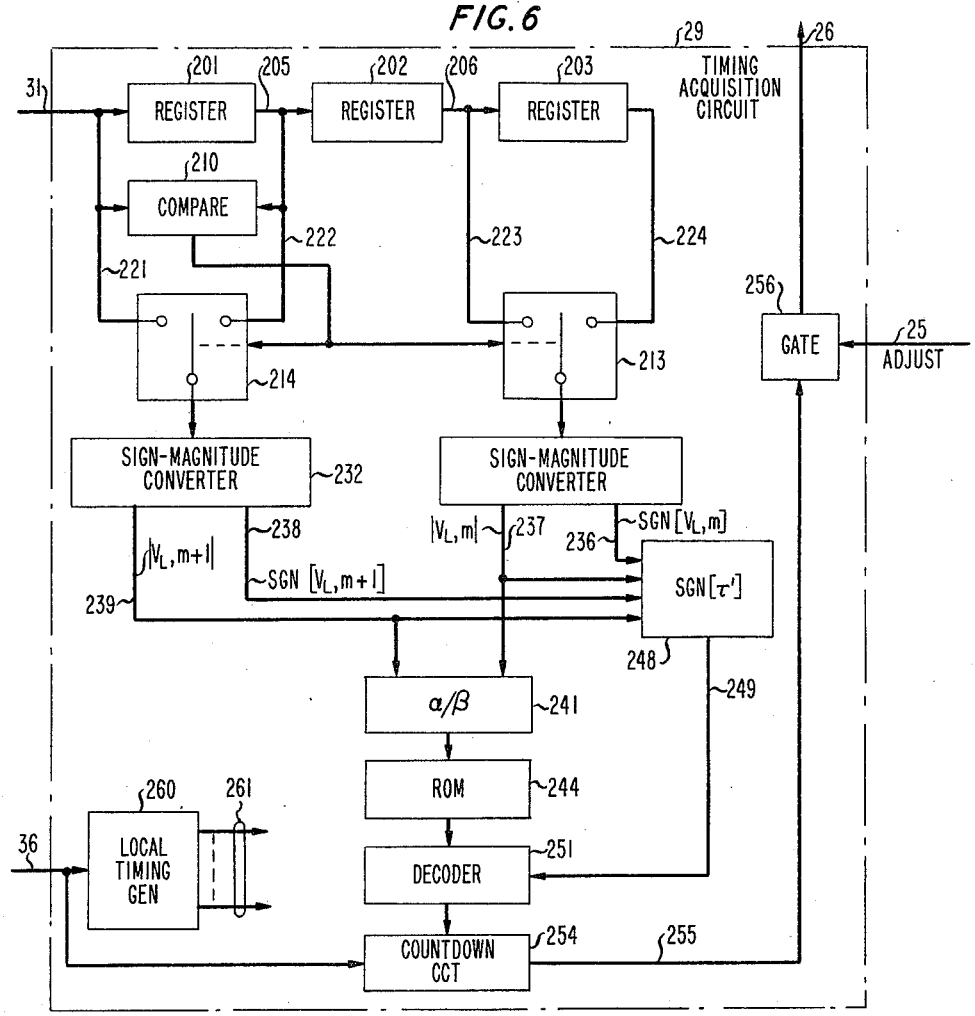
FIG. 6 is a block diagram of the timing acquisition circuitry used in the receiver of FIG. 2.

Attention is now directed to FIG. 6, which is a block diagram of timing acquisition circuit 29. The overall function of circuit 29 is to receive the timing acquisition equalizer outputs—the $v_I$'s and $v_Q$'s—generated at the output of demodulator 57 in response to the transmitted double-dotting pattern, and to determine $|\tau'|$ and $\text{sgn}[\tau']$ therefrom in accordance with the above expressions. If the sampling phase, i.e., the operation of receiver timing generator 27, is to be retarded by $|\tau'|$, circuit 29 generates an inhibit signal on its output lead 26 for a time interval equal to $|\tau'|$. Lead 26 extends to receiver timing generator 27. The latter is essentially a divider circuit which puts out on lead 38 a sampling pulse for each 64 master clock pulse that it counts (there being 128 master clock pulses in each T second interval). Timing generator 27 is inhibited from counting master clock pulses, however, for the duration of the inhibit signal on lead 26. The sampling phase is thus retarded by $|\tau'|$. If the sampling phase is to be advanced by $|\tau'|$, the inhibit signal on lead 26 is generated for a time interval equal to $T - |r'|$; retarding the sampling phase by $T = |\tau'|$ is equivalent to advancing it by $|\tau'|$.

Timing acquisition circuit 29 illustratively includes its own local timing generator 260 which receives the master clock pulses from lead 36 and generates its own timing signals on leads 261. The latter, rather than leads from receiver timing generator 27, illustratively control the timing of the operation of the components of circuit 29.

More particularly, the equalized timing acquisition signals $v_{I,m}$, $v_{Q,m}$, $V_{I,m+1}$, $V_{Q,m+1}$ are applied seriatim from lead 31 through serial in-serial out shift registers 201–203 via connecting leads 205 and 206. Each of the registers 201–203 is capable of holding one of these signals. Attention is directed to the point in time that $v_{I,m}$ has been fully shifted into register 201. The bits of $v_{I,m}$ now begin to appear on lead 205 as they pass into register 202 while the bits of $V_{Q,m}$ appear on lead 31. As corresponding bits of timing acquisition equalizer outputs $v_{I,m}$ and $v_{Q,m}$ appear on leads 205 and 31, respectively, comparator 210 compares them and determines which is the larger. After $v_{I,m}$ has been loaded into register 203—$v_{Q,m}$ and $v_{I,m+1}$ now being in registers 202 and 201, respectively—comparator 210 operates switches 213 and 214. If $v_{I,m}$ was determined to be larger (the situation depicted in FIG. 5), switches 213 and 214 are thrown to the right so that $v_{I,m}$ and $v_{I,m+1}$ will be used to determine $\tau'$. In particular, as the timing acquisition equalizer outputs continue shifting to the right, the bits of $v_{I,m}$ would pass via lead 224 and switch 213 to sign-magnitude converter 231 while the bits $v_{I,m+1}$ would pass via lead 222 and switch 214 to sign-magnitude converter 232. If, on the other hand, $v_{Q,m}$, were to be larger than $v_{I,m}$, then $v_{Q,m}$ and $V_{Q,m+1}$ would be used to determine $\tau'$. In this event, comparator 210 would throw switches 213 and 214 to the left. Converters 231 and 232 would then receive $v_{Q,m}$ and $v_{Q,m+1}$, respectively. Whichever set of timing acquisition equalizer outputs reaches converters 231 and 232 is, as previously described, notationally represented as $v_{L,m}$ and $v_{L,m+1}$.

Sign-magnitude converters 231 and 232 provide binary words representing the magnitudes $|v_{L,m}|$ and $|v_{L,m+1}|$, respectively, on leads 237 and 239. They also provide a single bit on each of leads 236 and 238 representing the signs of $v_{L,m}$ and $v_{L,m+1}$, respectively. The magnitudes on leads 237 and 239 pass to arithmetic circuit 241. The latter forms the quotient $\gamma/\beta$ by dividing the smaller of $|v_{L,m}|$ and $|v_{L,m+1}|$ by the larger. That quotient, represented as a five-bit word, passes to read-only memory (ROM) 244. For each value of $\gamma/\beta$ there is a corresponding $|\tau'|$. For each $|\tau'|$, in turn, there is a corresponding number of master clock pulses by which the operation of timing generator 27 is to be retarded or advanced. ROM 244 provides a look-up table function, converting the value of $\gamma/\beta$ directly into the corresponding number of master clock pulses.

At the same time, sign computation circuit 248, which receives the signals on each of leads 236-239, computes $\text{sgn}[\tau']$ in accordance with the above expression therefor. A bit indicating the value of $\text{sgn}[\tau']$ is extended to decoder 251 or lead 249. If $\text{sgn}[\tau']=+1$, the sampling phase is to be retarded. In this case the output of ROM 244 is simply passed through decoder 251 to countdown circuit 254. If $\text{sgn}[\tau']=-1$, the sampling phase is to be advanced. In this event, decoder 251 subtracts the count provided by ROM 244 from 128, which, again, is illustratively the number of master clock pulses which occur in T seconds. As previously described, advancing the timing epoch by $|\tau'|$ is equivalent to retarding it by $T-|\tau'|$.

At a predetermined point in each receiver symbol interval, circuit 254 initiates an inhibit signal on lead 255, which is passed through to lead 26 via gate 256. At the same time, circuit 254 responds to each master clock pulse by decrementing the count theretofore loaded into it from decoder 251. When that count reaches zero, the inhibit signal on lead 255 is terminated. The inhibit signal is thus of duration $|\tau'|$ or $T-|\tau'|$, as appropriate.

Circuit 29 operates continuously. That is, not only does it perform the above described signal processing on the timing acquisition equalizer outputs, but on all the equalizer outputs generated at the output of demodulator 57. One advantage of having circuit 29 operate continuously is that it is easier to trouble-shoot in case of circuit malfunction. Of course, except when circuit 29 is operating on the timing acquisition equalizer outputs as just explained, any inhibit signal generated on lead 255 is meaningless. The function of gate 256 is to allow the signal on lead 255 to pass onto lead 26 only when timing acquisition is being performed. To this end, gate 256 is operated when a sampling phase adjustment is to be made. This is indicated by a signal on sampling phase adjust lead 25, which extends from receiver timing generator 27.

In an actual embodiment of the invention, the design of timing acquisition circuit 29 was such that timing acquisition required only five symbol intervals from the time that the first bit of $v_{I,m}$ appears on lead 31. It will be recalled from the above expression for $Q_m$ and $Q_m$, however, that the generation of each equalizer output on lead 31 entails the multiplication in each of equalizer units 55 and 56 of 2 M coefficient by an equal number of line samples. Thus, before any timing acquisition equalizer outputs can be formed at the output of demodulator 57, 2 M samples of the received timing acquisition signal must be loaded into each equalizer unit. In the present illustrative embodiment, M=16. Thus there is a potential delay of at least thirty-two symbol intervals before the sampling phase correction can be made.

This delay is substantially reduced in accordance with the technique taught in commonly-assigned U.S. patent application Ser. No. 75,647 filed on the same day as this application. That patent application teaches that if N, T and $\omega_c$ are chosen such that $\omega_c NT = 2\pi n$, n being any integer, the values of the line samples themselves repeat with a period equal to that of the timing acquisition signal. This criterion is satisfied in the present illustrative embodiment since $\omega_c = 2\pi \cdot 1800$, N=4 and T=1/2400. Thus, once four symbol intervals worth of line samples of the received timing acquisition signal, i.e., eight line samples, have been formed, the values of the rest of the line samples needed in each equalizer unit in order to begin forming the timing acquisition equalizer outputs can be replicated therefrom. That is, $$R_m = R_{m-4k}$$
$$R_m' = R_{m-4k}' \qquad k = 1,2...$$

Figure 7:
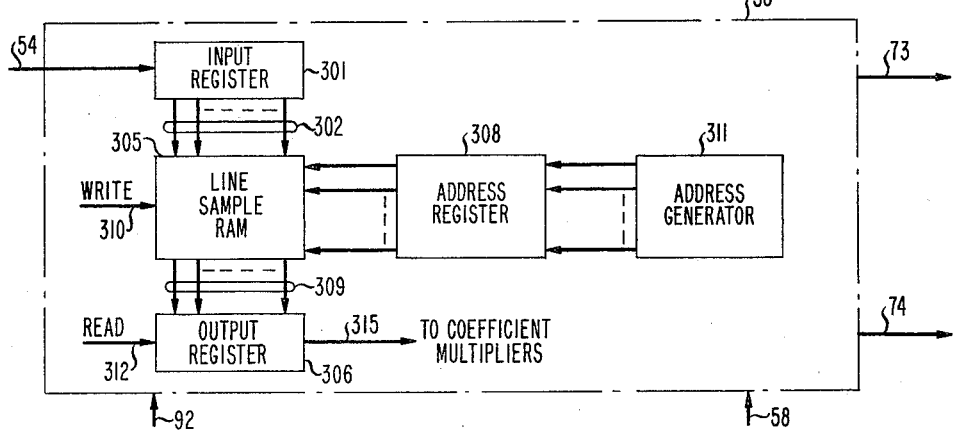
FIG. 7 is a block diagram of an equalizer unit used in the receiver of FIG. 2.

The manner in which the line samples are replicated will vary with the circuit arrangement used to store the line samples. FIG. 7 shows one possible line sample storage arrangement for use in equalizer unit 55. (A similar arrangement would be used in equalizer unit 56.)

At the heart of the line sample storage arrangement is line sample random access memory (RAM) 305. RAM 305 has K storage locations each associated with a different binary address from 0 to (K−1). The arrangement of FIG. 7 also includes input and output registers 301 and 306, respectively, address register 308 and address generator 311. Line sample components from lead 54 are loaded into successive storage locations in RAM 305, real component first. When line sample component $r_m$ for example, is to be read into RAM 305, that component is shifted in serial form from lead 54 into register 301. At the same time, address generator 311 loads an address into register 308. A subsequent write pulse on lead 310 causes $r_m$ to pass in parallel form via leads 302 into the location in RAM 305 identified by the address in register 308. Line sample component $\hat{r}_m$ is thereafter loaded into the next location within RAM 305 in a similar manner.

RAM 305 always provides in parallel form on leads 309 the contents of the storage location identified by the current address in register 308. To read out a desired line sample component, then, address generator 311 loads the appropriate address into register 308 and read lead 312 is pulsed. This causes the data on leads 309 to be loaded into output register 306 whence they are shifted out onto lead 315 for processing, e.g., coefficient multiplication.

Once a line sample component is stored at a particular address in RAM 305 it remains at that location until it is sufficiently "old" that it is no longer needed. With such an approach, generation of addresses in address generator 311 may be advantageously carried out by storing within generator 311 a data word referred to as a "pointer" or "virtual origin". At any point in time, the value of the pointer is equal to the address within RAM 305 of the last line sample component which was stored. The address in which a newly-received sample component is to be stored is then generated by incrementing the pointer by unity.

Generating the address of the location in which the $i^{th}$ previous real or imaginary line sample component was stored (in order to read that component into register 306, for example) is accomplished by subtracting $(2i+1)$ from the pointer to retrieve the real component or subtracting $(2i)$ to retrieve the imaginary component.

In order to replicate every eighth line sample of the received timing acquisition signal, the real component of the first line sample thereof is read into RAM 305 in the manner described above. A succession of addresses is then generated by adding multiples of eight to the pointer. As each address is loaded into register 308, write lead 310 is strobed, causing the line sample component value in register 301 to be replicated in the appropriate locations in RAM 305. The imaginary component of the same line sample component is then loaded into register 301, the pointer within address generator 311 is set to the appropriate value, and the process is repeated. The real and imaginary components of the timing acquisition signal samples formed during the next seven symbol intervals are replicated within RAM 305 in a similar manner.

Although not explicitly stated above, it should be understood that whenever adding or subtracting a number from the pointer results in an address outside of the range 0 to $(K-1)$, the number k is to be added to or subtracted from that address so as to bring the address within the 0 to $(K-1)$ range. This happens automatically if K is a power of 2.

Figure 8:
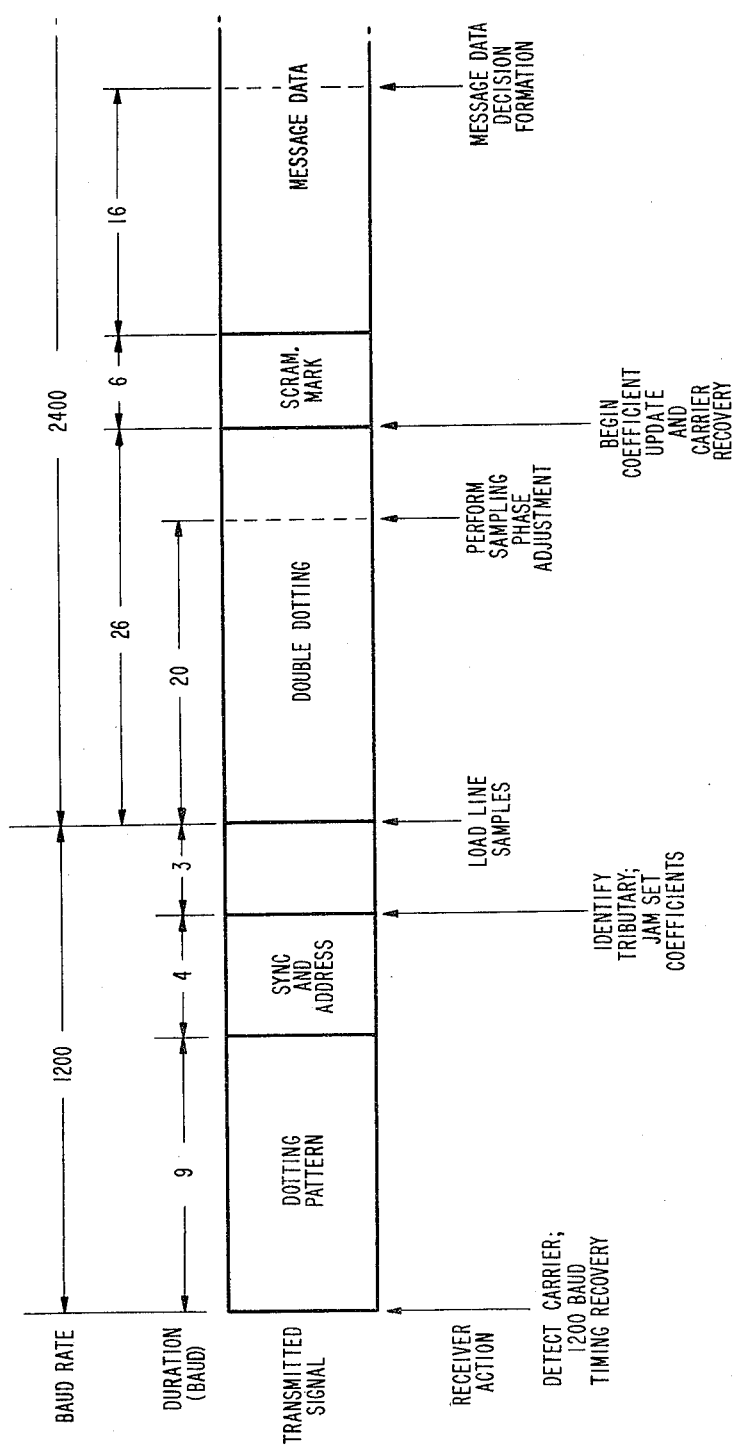
FIG. 8 is a timing diagram showing an illustrative overall start-up sequence for the transmission of data from a tributary modem to the master modem in the communication system of FIG. 1.

An illustrative overall start-up sequence for transmission from one of tributary modems 11a, 11b, ... 11n to master modem 20 is depicted in FIG. 8. The tributary modem begins transmitting at the rate of 1200 baud. The transmission at this rate, more particularly begins with ten symbol intervals of dotting pattern $(+1, -1, +1, -1$ etc.). The dotting pattern serves two functions. First, it informs the master modem that a transmission is beginning (the so-called carrier detect function). The dotting pattern is also used to determine an appropriate timing epoch for recovering the information contained in the next ten symbol intervals. The latter information, in particular, is comprised of six symbol intervals of synchronization and address information, the latter identifying the address of the tributary modem which is transmitting. A 1200 baud rate is sufficiently slow that the synchronization and address information can be accurately recovered by the master modem without equalization. As previously described, the address of the tributary modem is provided on lead 94 (FIG. 2), and store 91 responds by jam setting a previously-determined set of coefficients for the channel in question into equalizer units 55 and 56.

After a short delay or perhaps three symbol intervals, during which the transmitter in the tributary modem changes its transmission mode, the tributary modem begins transmitting double dotting pattern at the 2400 baud rate. As the samples of the double dotting pattern are formed, they are stored in equalizer units 55 and 56 in the replicated manner described above. In addition to the four symbol intervals necessary to store the line samples, the receiver requires a number of additional symbol intervals to perform the above-described demodulation and other signal processing required to generate baseband equalizer outputs at the output of demodulator 57 and to permit transients to die out. After twenty symbol intervals of received double dotting, in particular, the duration of the inhibit signal on lead 255 (FIG. 6) is assured to be an accurate measure of the timing error. At this time, then, lead 25 (FIGS. 2 and 6) is activated, causing the above-described advance or retard of the sampling phase, i.e., of the operation of receiver timing generator 27. Double dotting continues for four more symbol intervals, allowing equalizer units 55 and 56 to be filled with line samples taken with the new, correct timing epoch. The inhibit on carrier source 81 is released at this time, allowing it to begin to make its estimate, $\theta_m^*$, of the demodulation carrier phase. The fact that the estimate of $\theta_m^*$ is made with line samples taken with the correct timing epoch allows that estimate to be made rapidly. The inhibit on the coefficient update circuitry is also released at this time, allowing the coefficients to fine tune from their jam set values. This is followed by six symbol intervals of scrambled "mark" to allow the scramblers in the transmitter and receiver to synchronize with each other. The overall turn-around time is thus sixteen symbol intervals at 1200 baud and thirty-two symbols intervals at 2400 baud for a total of 26.7 ms.

The message data is now transmitted. After sixteen symbol intervals of message data, corresponding to the time that the initial samples thereof have reached the center of the equalizer units, decisions as to the values of the transmitted symbols begin to appear on lead 86 (FIG. 2).

The foregoing merely illustrates the principles of the present invention. For example, virtually any signal having frequency components which satisfy the above-discussed criteria can be used a the timing acquisition signal. The data pattern $+2, -1, -1, +2, -1, -1,$ etc., for example, is a possibility. Determining $\tau'$ from such a pattern, however, would require the processing of three timing acquisition equalizer outputs, rather than two, adding to the complexity of the circuitry, and to the time, required to do the necessary processing. Thus, the double-dotting pattern is preferred. Analog signals appropriately phased with respect to the transmitter timing circuitry could also be used as the transmitted timing acquisition signal rather than a digital data pattern modulated onto the carrier.

Moreover, it should be appreciated that although $\tau'$ is illustratively determined herein by processing a plurality of timing acquisition equalizer outputs via an appropriate trigonometric relationship, it is theoretically possible to determine $\tau'$ from but one equalized timing acquisition signal by correlating the magnitude thereof with $\tau'$. Such an approach, however, necessitates the use of very accurate automatic gain control circuitry, making it less attractive than the approach described herein.

It will thus be appreciated that those skilled in the art will be able to devise various arrangements embodying the principles of the invention without departing from the spirit and scope of our inventive teachings.

We claim:

1. A receiver adapted to receive a data signal representing a plurality of data symbols and transmitted to said receiver from a data source at a rate of 1/T symbols per second, said receiver being comprised of equalizer means including means (21, 23, 27) for forming line samples of said data signal at a predetermined sampling rate and means (46, 53, 55, 56, 57, 64, 65, 81, 91) for filtering said line samples with a predetermined filter characteristic associated with said source to form a plurality of equalizer outputs, each of said equalizer outputs representing a respective one of said data symbols and each of said equalizer outputs being optimally free of intersymbol interference when said line samples are formed at optimum sampling points, characterized in that said data signal includes a predetermined timing acquisition signal, said timing acquisition signal having spectral components only at frequencies within the non-rolloff region of the equalized baseband-equivalent transfer function for said data signal from the source thereof through said equalizer means, said sample forming means forming line samples of said timing acquisition signal at sampling points displaced from the optimum sampling points thereof by a time $\tau$ and said equalizer means forming a plurality of timing acquisition equalizer outputs in response to said timing acquisition signal line samples, and further characterized in that said receiver is further comprised of means (29) for determining the value of $\tau$ in response to at least a first one of said timing acquisition equalizer outputs and for adjusting the phase of said line sample forming means by the value of $\tau$ thus determined.

2. The invention of claim 1 wherein said timing acquisition signal is periodic so that said timing acquisition equalizer outputs represent successive instantaneous samples of a periodic waveform and wherein said means for determining the value of $\tau$ is comprised of timing acquisition means (231, 232, 241, 244, 248) for determining the difference, $\sigma'$, between a) the location of said instantaneous samples along said periodic waveform and b) what their locations therealong would be if said timing acquisition signal were sampled at its optimum sampling points, whereby the value for $\tau'$ thus determined is equal to the value of $\tau$.

3. The invention of claim 2 wherein said timing acquisition means includes means (231, 232, 241) for determining the magnitude of $\tau'$ as a trigonometric function of a selected two of said timing acquisition equalizer outputs.

4. The invention of claim 3 wherein said timing acquisition signal represents a train of data symbols all having the same amplitude and successive pairs of which have alternating signs, and wherein said trigonometric function is $$|\tau'|=(2T/\pi)[(\pi/4)-\tan^{-1}(\gamma/\beta)]$$

where $\gamma$ and $\beta$ are the ones of said selected two timing acquisition equalizer outputs having the smaller and larger magnitudes, respectively.

5. The invention of claim 4 wherein the sign of $\tau'$, sgn[$\tau'$], is equal to $$\text{sgn}[\tau']=\text{sgn}[v_{L,m}]\text{sgn}[v_{L,m+1}]\text{sgn}[|v_{L,m+1}|-|v_{L,m}|]$$

$v_{L,m}$ being the first in time of said selected two timing acquisition equalizer outputs and $v_{L,m+1}$ being the second.

6. The invention of claims 2 or 5 wherein said data signal is a modulated data signal, wherein said filtering means is comprised of means for forming a plurality of passband equalizer outputs in response to said line samples and wherein said equalizer means further includes means (57, 81) for demodulating said passband equalizer outputs to form said equalizer outputs.

7. The invention of claim 6 wherein said filtering means is further comprised of means for multiplying each successive one of an ordered plurality of coefficients with a successive respective one of a plurality of said line samples and for forming the sum of the resulting products.

8. Apparatus for processing data signals received from an individual data source over a communication channel, each of said data signals representing a train of data symbols transmitted at a rate of 1/T symbols per second said apparatus comprising sampling means (21, 23, 27) for forming line samples of each one data signal at a predetermined sampling rate, equalizer means (46, 53, 55, 56, 57, 64, 65, 67, 81) operative during each one of a succession of T second intervals for multiplying individual ones of said line samples with respective coefficients and for forming in response to the sum of the resulting products an equalizer output representing an individual one of said symbols and for determining updated values for said coefficients, and means (91) for establishing initial values of said coefficients for the processing of an initial portion of said each one data signal, said initial values being substantially equal to values of said coefficients determined during the processing by said apparatus of a data signal previously received from said data source over said channel, characterized in that said initial portion includes a predetermined timing acquisition portion having spectral components only at one or more frequency pairs $\pm k\Omega$, $k=0, 1, 2 \ldots$ for which $G(k\Omega)=G(-k\Omega)$ and for which $G(k\Omega-2\pi/T)=0$, $G(\omega)$ being the equalized baseband-equivalent transfer function for data signals from said source through said equalizer means, and further characterized in that said apparatus further comprises timing acquisition means (29) for adjusting the phase of said sampling means as a function of the value of at least one equalizer output formed during the processing of said timing acquisition portion, said function being such that after said phase is adjusted, said each one data signal is sampled with the timing epoch associated with said initial coefficient values.

9. The invention of claim 8 wherein said timing acquisition portion is periodic so that equalizer outputs formed by said equalizer means during the processing of said timing acquisition portion represent successive instantaneous samples of a periodic waveform, and wherein said timing acquisition means includes means (231, 232, 241, 244, 248) for determining the difference between a) the locations of said instantaneous samples along said periodic waveform and b) what their locations would be if said one data signal were sampled with said timing epoch, and means (251, 254, 256) for adjusting said phase by the amount of said difference.

10. The invention of claim 9 wherein each of said data signals in comprised of a carrier signal modulated by said train of data symbols and wherein said timing acquisition portion is comprised of a repeated pattern of predetermined symbols modulated onto said carrier signal.

11. The invention of claim 10 wherein said pattern is comprised of two symbols both having the same predetermined magnitude and a first sign followed by two symbols both having said predetermined magnitude and a second sign.

12. A data communication system comprised of a data receiver and a plurality of data sources adapted to transmit to said data receiver over respective band-limited transmission channels data signals each representing a plurality of data symbols transmitted at a rate of $1/T$ symbols per second, each of said channels introducing intersymbol interference in the data signals transmitted thereover, said receiver including sampling means for forming line samples of each data signal received by said receiver at a predetermined sampling rate, equalizer means for processing said each received data signal including means operative during each one of a succession of T second time intervals for multiplying individual ones of said samples with respective ones of a predetermined ensemble of coefficients and for forming in repsonse to the sum of the resulting products an equalizer output representing an individual one of the date symbols represented by said each received data signal and for determining updated values for siad coefficients, and means operative in response to a signal identifying the source of said each received data signal for establishing as initial values of said predetermined ensemble of coefficient values the coefficient values determined during the processing by said equalizer means of a data signal previously received from said source, said initial values having an associated optimum timing epoch, characterized in that each data signal includes a predetermined timing acquisition portion having spectral components only at one or more frequency pairs $\pm k\Omega$, $k=0, 1, 2 \ldots$ for which $G(K\Omega)=G(-k\Omega)$, and for which $G(k\Omega - 2\pi/T)=0$, $G(\omega)$ being the equalized baseband-equivalent transfer function for said each data signal from said source through said equalizer means and further characterized in that said receiver further includes means for determining said optimum timing epoch in response to at least one equalizer output formed by said equalizer means during the processing of said timing acquisition portion.

13. The invention of claim 12 wherein said timing acquisition portion is periodic so that equalizer outputs formed by said equalizer means during the processing of said timing acquisition portion represent successive instantaneous samples of a periodic waveform, and wherein said determining means includes means (231, 232, 241, 244, 248) for determining the difference $\tau'$ between (a) the locations of said instantaneous samples along said periodic waveform and (b) what their locations would be if said one data signal were sampled with said optimum timing epoch, and means (251, 254, 256) for adjusting the phase of said sampling means by the amount of said difference.

14. The invention of claim 13 wherein each of said data signals is comprised of a carrier signal modulated by said train of data symbols and wherein said timing acquisition portion is comprised of a repeated pattern of predetermined symbols modulated onto said carrier signal.

15. The invention of claim 14 wherein said pattern is comprised of two symbols both having the same predetermined magnitude and a first sign followed by two symbols both having said predetermined magnitude and a second sign.

16. The invention of claim 13 wherein said determining means includes means (231, 232, 241) for determining the magnitude of $v'$ as a trigonometric function of a selected two equalizer outputs formed by said equalizer means during the processing of said timing acquisition portion.

17. The invention of claim 16 wherein said timing acquisition portion represents a train of data symbols all having the same amplitude and successive pairs of which have alternating signs, and wherein said trigonometric function is $$|\tau'| = (2T/\pi)[(\pi/4) - \tan^{-1}(\gamma/\beta)]$$

where $\gamma$ and $\beta$ are the ones of said selected two equalizer outputs having the smaller and larger magnitudes, respectively.

18. The invention of claim 17 wherein the sign of $\tau'$, $\text{sgn}[\tau']$, is equal to $$\text{sgn}[\tau'] = \text{sgn}[v_{L,m}]\text{sgn}[v_{L,m+1}]\text{sgn}[|v_{L,m+1}| - |v_{L,m}|],$$

$v_{L,m}$ being the first in time of said selected two equalizer outputs and $v_{L,m+1}$ being the second.

19. A method for use in a receiver adapted to receive a data signal representing a plurality of data symbols and transmitted to said receiver from a data source at a rate of $1/T$ symbols per second, said method being comprised of the steps of forming line samples of said data signal at a predetermined sampling rate, filtering said line samples in a filter having a predetermined filter characteristic associated with said source to form a plurality of equalizer outputs, each of said equalizer outputs representing a respective one said data symbols and each of said equalizer outputs being optimally free of intersymbol inerference when said line samples are formed at optimum sampling points, characterized in that said data signal includes a predetermined timing acquisition signal, said timing acquisition signal having spectral components only at one or more frequency pairs ±kΩ, k=0, 1, 2 . . . for which G(kΩ)=G(−kΩ) and for which G(kΩ−2π/T)=0, G(ω) being the equalized baseband-equivalent transfer function for said data signal from the source thereof through said filter, the line samples of said timing acquisition signal being formed at sampling points displaced from the optimum sampling points thereof by a time τ and a plurality of timing acquisition equalizer outputs being formed in said filtering step in response to said timing acquisition signal line samples, and further characterized in that said method is further comprised of the steps of determining the value of τ in response to at least a first one of said timing acquisition equalizer outputs and changing the phase with which said line samples are formed by the value of τ thus determined.

20. The invention of claim 19 wherein said timing acquisition signal is periodic so that said timing acquisition equalizer outputs represent successive instantaneous samples of a periodic waveform and wherein said determining step is comprised of the step of determining the difference, τ', between (a) the location of said instantaneous samples along said periodic waveform and (b) what their locations therealong would be if said timing acquisition signal were sampled at its optimum sampling points, whereby the value of τ' thus determined is equal to the value of τ.

21. The invention of claim 20 wherein in said difference determining step the magnitude of τ' is determined as a trigonometric function of a selected two of said timing acquisition equalizer outputs.

22. The invention of claim 21 wherein said timing acquisition signal represents a train of data symbols all having the same amplitude and successive pairs of which have alternating signs, and wherein said trigonometric function is $|\tau'| = (2T/\pi)[(\pi/4) - \tan^{-1}(\gamma/\beta)]$ where $\gamma$ and $\beta$ are the ones of said selected two timing acquisition equalizer outputs having the smaller and larger magnitudes, respectively.

23. The invention of claim 22 wherein the sign of τ', sgn[τ'], is equal to $\text{sgn}[\tau'] = \text{sgn}[v_{L,m}]\text{sgn}[v_{L,m+1}]\text{sgn}[|v_{L,m+1}| - |v_{L,m}|]$, $v_{L,m}$ being the first in time of said selected two timing acquisition equalizer outputs and $v_{L,m+1}$ being the second.

24. The invention of claims 20 or 23 wherein said data signal is a modulated data signal, wherein said filtering step is comprised of the steps of forming a plurality of passband equalizer outputs in response to said line samples and demodulating said passband equalizer outputs to form said equalizer outputs.

25. The invention of claim 24 wherein said filtering step is comprised of the further steps of multiplying each successive one of an ordered plurality of coefficients with a successive respective one of a plurality of said line samples and forming the sum of the resulting products.

26. A method of for processing data signals received from an individual data source over a communication channel, each of said data signals representing a train of data symbols transmitted at a rate of 1/T symbols per second, said method comprising the steps of forming line samples of each one data signal at a predetermined sampling rate, equalizing individual ones of said line samples in an equalizer means during each one of a succession of T second intervals, said equalizing step including the steps of multiplying said individual ones of said samples with respective coefficients, forming in response to the sum of the resulting products an equalizer output representing an individual one of said symbols and determining updated values for said coefficients, and establishing initial values of said coefficients for the processing of an initial portion of said each one data signal, said initial values being equal to values of said coefficients determined during the processing in accordance with said method of a data signal previously received from said data source over said channel, characterized in that said initial portion includes a predetermined timing acquisition portion having spectral components only at frequencies within the non-rolloff region of the equalized baseband-equivalent transfer function for data signals from said source through said equalizer means, and further characterized in that said method is comprised of the further step of adjusting the phase with which said line samples are formed as a function of the value of at least one equalizer output formed during the processing of said timing acquisition portion, said function being such that after said phase is adjusted, said each one data signal is sampled with the timing epoch associated with said initial coefficient values.

27. The invention of claim 26 wherein said timing acquisition portion is periodic so that equalizer outputs formed in said equalizing step during the processing of said timing acquisition portion represent successive instantaneous samples of a periodic waveform, and wherein said phase adjusting step includes the steps of determining the difference between (a) the locations of said instantaneous samples along said periodic waveform and (b) what their locations would be if said one data signal were sampled with said timing epoch, and adjusting said phase by the amount of said difference.

28. The invention of claim 27 wherein each of said data signals is comprised of a carrier signal modulated by said train of data symbols and wherein said timing acquisition portion is comprised of a repeated pattern of predetermined symbols modulated onto said carrier signal.

29. The invention of claim 28 wherein said pattern is comprised of two symbols both having the same predetermined magnitude and a first sign followed by two symbols both having said predetermined magnitude and a second sign.

30. Circuitry for use in a data receiver to which a predetermined timing acquisition signal is transmitted from a data source, said circuitry including means (21, 23, 27) for forming line samples of said timing acquisition signal at a predetermined sampling rate, said line sample forming means forming said line samples at sampling points displaced from desired sampling points on said timing acquisition signal by a time τ, signal processing means (46, 53, 55, 56, 57, 64, 65, 81, 91) for forming a plurality of timing acquisition outputs in response to said line samples at a rate of 1/T per second, and means (29) for determining the value of $\tau$ in response to at least first and second ones of said timing acquisition outputs and for adjusting the phase of said line sample forming means by the value of $\tau$ thus determined, characterized in that said signal processing means includes means (46, 53, 55, 56, 64, 65) for filtering said line samples with a predetermined filter characteristic associated with said source, said filter characteristic and said desired sampling points being such that said timing acquisition outputs have a predetermined amplitude relationship to one another when said line samples are formed at said desired sampling points and further characterized in that said timing acquisition signals has spectral components only at frequencies within the non-rolloff region of the transfer function for said timing acquisition signal from the source thereof through said signal processing means.

31. The invention of claim 30 wherein said frequencies comprise at least one frequency pair $\pm k\Omega$, $k=0, 1, 2 \ldots$, for which $G(k\Omega)=G(-k\Omega)$ and for which $G(k\Omega - 2\pi/T)=0$, $G(\omega)$ being the baseband equivalent of said transfer function.

32. The invention of claim 31 wherein said timing acquisition signal is periodic so that said timing acquisition outputs represent successive instantaneous samples of a periodic waveform and wherein said means for determining the value of $\tau$ is comprised of timing acquisition means (231, 232, 241, 244, 248) for determining the difference, $\tau'$, between (a) the location of said instantaneous samples along said periodic waveform and (b) what their locations therealong would be if said timing acquisition signal were sampled at said desired sampling points, whereby the value of $\tau'$ thus determined is equal to the value of $\tau$.

33. The invention of claim 32 wherein said timing acquisition means includes means (231, 232, 241) for determining the magnitude of $\tau'$ as a trigonometric function of a selected two of said timing acquisition outputs.

34. The invention of claim 33 wherein said timing acquisition signal represents a train of signal levels all having the same amplitude and successive pairs of which have alternating signs, and wherein said trigonometric function is $$|\tau'| = (2T/\pi)[(\pi/4) - \tan^{-1}(\gamma/\beta)],$$

where $\gamma$ and $\beta$ are the ones of said selected two timing acquisition outputs having the smaller and larger magnitudes, respectively.

35. The invention of claim 34 wherein the sign of $\tau'$, $\text{sgn}[\tau']$, is given by $$\text{sgn}[\tau'] = \text{sgn}[v_{L,m}]\text{sgn}[V_{L,m+1}]\text{sgn}[|v_{L,m+1}| - |v_{L,m}|],$$

$v_{L,m}$ being the first in time of said selected two timing acquisition outputs and $V_{L,m+1}$ being the second.

36. The invention of claims 32 or 35 wherein said timing acquisition signal is a modulated signal, wherein said filtering means is comprised of means for forming a plurality of passband outputs in response to said line samples and wherein said signal processing means further includes means (57, 81) for demodulating said passband outputs to form said timing acquisition outputs.

37. The invention of claim 36 wherein said filtering means is further comprised of means for multiplying each successive one of an ordered plurality of coefficients with a successive respective one of a plurality of said line samples and for forming the sum of the resulting products.

38. A method for use in a data receiver to which a predetermined timing acquisition signal is transmitted from a data source, said method comprising the steps of forming line samples of said timing acquisition signal at a predetermined sampling rate at sampling points displaced from desired sampling points on said timing acquisition signal by a time $\tau$, forming a plurality of timing acquisition outputs in response to said line samples at a rate of 1/T per second, determining the value of $\tau$ in response to at least first and second ones of said timing acquisition outputs, and adjusting the phase with which said line samples are formed by the value of $\tau$ thus determined, characterized in that the second of said forming steps include the step of filtering said line samples with a predetermined filter characteristic associated with said source, said filter characteristic and said desired sampling points being such that said timing acquisition outputs have a predetermined amplitude relationship to one another when said line samples are formed at said desired sampling points and further characterized in that said timing acquisition signal has spectral components only at frequencies within the non-rolloff region of the transfer function for said timing acquisition signal from the transmission thereof through the second of said forming steps.

39. The invention of claim 38 wherein said frequencies comprise at least one frequency pair $\pm k\Omega$, $k=0, 1, 2 \ldots$, for which $G(k\Omega)=G(-k\Omega)$ and for which $G(k\Omega - 2\pi/T)=0$, $G(\omega)$ being the baseband equivalent of said transfer function.

40. The invention of claim 39 wherein said timing acquisition signal is periodic so that said timing acquisition outputs represent successive instantaneous samples of a periodic waveform and wherein, said determining step is comprised of the step of determining the difference, $\tau'$, between (a) the location of said instantaneous samples along said periodic waveform and (b) what their locations therealong would be if said timing acquisition signal were sampled at said desired sampling points, whereby the value of $\tau'$ thus determined is equal to the value of $\tau$.

41. The invention of claim 40 wherein said difference determining step includes the step of determining the magnitude of $\tau'$ as a trigonometric function of a selected two of said timing acquisition outputs.

42. The invention of claim 39 wherein said timing acquisition signal represents a train of signal levels all having the same amplitude and successive pairs of which have alternating signs, and wherein said trigonometric function is $$|\tau'| = (2T/\pi)[(\pi/4) - \tan^{-1}(\gamma/\beta)],$$

where $\gamma$ and $\beta$ are the ones of said selected two timing acquisition outputs having the smaller and larger magnitudes, respectively.

43. The invention of claim 42 wherein the sign of $\tau'$ is equal to $$\text{sgn}[v_{L,m}]\text{sgn}[v_{L,m+1}]\text{sgn}[|v_{L,m+1}|-|v_{L,m}|],$$

$v_{L,m}$ being the first in time of said selected two timing acquisition outputs and $v_{L,m+1}$ being the second.

44. The invention of claims 40 or 43 wherein said timing acquisition signal is a modulated signal, wherein said filtering step is comprised of the step of forming a plurality of passband outputs in response to said line samples and wherein the second of said forming steps includes the further step of demodulating said passband outputs to form said timing acquisition outputs.

45. The invention of claim 44 wherein said passband output forming step is comprised of the steps of multiplying each successive one of an ordered plurality of coefficients with a successive respective one of a plurality of said line samples and forming the sum of the resulting products.

46. The invention of claim 1 wherein said frequencies comprise at least one frequency pair $\pm k\Omega$, $k=0, 1, 2 \ldots$, for which $G(k\Omega)=G(-k\Omega)$ and for which $G(k\Omega-2\pi/T)=0$, $G(\omega)$ being said transfer function.

47. The invention of claim 6 wherein said frequencies comprise at least one frequency pair $\pm k\Omega$, $k=0, 1, 2 \ldots$, for which $G(k\Omega)=G(-k\Omega)$ and for which $G(k\Omega-2\pi/T)=0$, $G(\omega)$ being said transfer function.

48. The invention of claims 26 or 29 wherein said frequencies comprise at least one frequency pair $\pm k\Omega$, $k=0, 1, 2 \ldots$, for which $G(k\Omega)=G(-k\Omega)$ and for which $G(k\Omega-2\pi/T)=0$, $G(\omega)$ being said transfer function.

* * * * *